United States Patent
Park et al.

(10) Patent No.: US 9,465,268 B2
(45) Date of Patent: Oct. 11, 2016

(54) LIQUID CRYSTAL DISPLAY DEVICE WHEREIN EACH OF A PLURALITY OF FIRST GATE LINES IS SPACED APART FROM A CORRESPONDING DATA LINE WITH A COMMON VOLTAGE LINE THEREBETWEEN

(71) Applicant: LG DISPLAY CO., LTD., Seoul (KR)

(72) Inventors: JongSin Park, Paju-si (KR); Chul Nam, Seoul (KR); JaeHyung Jo, Busan (KR)

(73) Assignee: LG Display Co., Ltd., Seoul (KR)

( * ) Notice: Subject to any disclaimer, the term of this patent is extended or adjusted under 35 U.S.C. 154(b) by 351 days.

(21) Appl. No.: 13/906,081

(22) Filed: May 30, 2013

(65) Prior Publication Data

US 2014/0168553 A1    Jun. 19, 2014

(30) Foreign Application Priority Data

Dec. 13, 2012  (KR) .......................... 10-2012-0145533

(51) Int. Cl.
| | | |
|---|---|---|
| *G02F 1/1362* | (2006.01) | |
| *G02F 1/1343* | (2006.01) | |
| *G02F 1/1345* | (2006.01) | |
| *G09G 3/36* | (2006.01) | |

(52) U.S. Cl.
CPC ....... *G02F 1/136286* (2013.01); *G02F 1/1345* (2013.01); *G02F 1/134363* (2013.01); *G09G 3/3677* (2013.01); *G02F 2001/13456* (2013.01); *G02F 2001/13629* (2013.01); *G09G 2300/0426* (2013.01); *G09G 2300/0465* (2013.01); *G09G 2310/0278* (2013.01); *G09G 2310/0281* (2013.01)

(58) Field of Classification Search
CPC ................. G02F 1/13306; G02F 2001/13456; G02F 1/133; G09G 2310/0281; G09G 2300/0465
USPC .................................................. 349/149–152
See application file for complete search history.

(56) References Cited

U.S. PATENT DOCUMENTS

| | | | |
|---|---|---|---|
| 6,249,326 B1 | 6/2001 | Hebiguchi | |
| 2002/0044227 A1 | 4/2002 | Lee | |
| 2003/0063248 A1 | 4/2003 | Komeno et al. | |
| 2004/0012744 A1* | 1/2004 | Ishige ................... | G02F 1/1345 349/139 |

(Continued)

FOREIGN PATENT DOCUMENTS

| | | |
|---|---|---|
| CN | 101308294 A | 11/2008 |
| CN | 101644864 A | 2/2010 |

(Continued)

OTHER PUBLICATIONS

Office Action dated Nov. 30, 2015 for corresponding Chinese Patent Application No. 201310384524.0, 19 pages.

*Primary Examiner* — Paul Lee

(74) *Attorney, Agent, or Firm* — Brinks Gilson & Lione

(57) ABSTRACT

An LCD device includes a plurality of first vertical gate lines and a plurality of data lines vertically disposed in a liquid crystal panel, a plurality of second horizontal gate lines horizontally disposed in the liquid crystal panel, and a plurality of driving ICs disposed in an upper or lower non-display area of the liquid crystal panel. The plurality of horizontal gate lines and the plurality of vertical gate lines may be disposed on different layers. The plurality of vertical gate lines and the plurality of horizontal gate lines are electrically connected to each other in respective pairs through a contact in an overlapping area therebetween.

21 Claims, 15 Drawing Sheets

(56) References Cited

U.S. PATENT DOCUMENTS

| | | |
|---|---|---|
| 2005/0139837 A1 | 6/2005 | Lee et al. |
| 2007/0296881 A1* | 12/2007 | Choi ................. G02F 1/136204 349/40 |
| 2008/0024712 A1 | 1/2008 | Kim |
| 2008/0284967 A1 | 11/2008 | Oh et al. |
| 2010/0002180 A1 | 1/2010 | Kim et al. |
| 2010/0033664 A1 | 2/2010 | Lee |
| 2010/0079717 A1* | 4/2010 | Park et al. .................... 349/152 |
| 2010/0110057 A1 | 5/2010 | Lee et al. |
| 2011/0279418 A1* | 11/2011 | Han .................. G02F 1/136286 345/204 |

FOREIGN PATENT DOCUMENTS

| | | |
|---|---|---|
| CN | 101726906 A | 6/2010 |
| CN | 102243838 | 11/2011 |
| EP | 1882975 A1 | 1/2008 |
| JP | 2002-162640 A | 6/2002 |

\* cited by examiner

FIG. 5
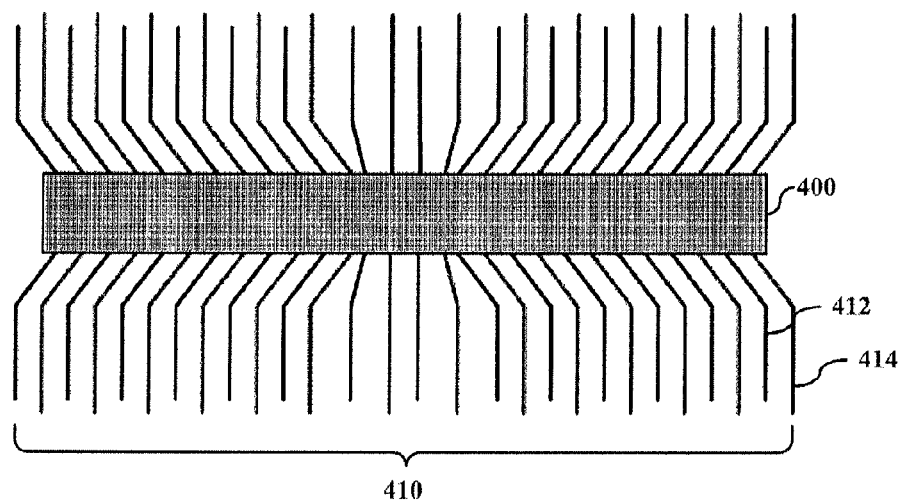
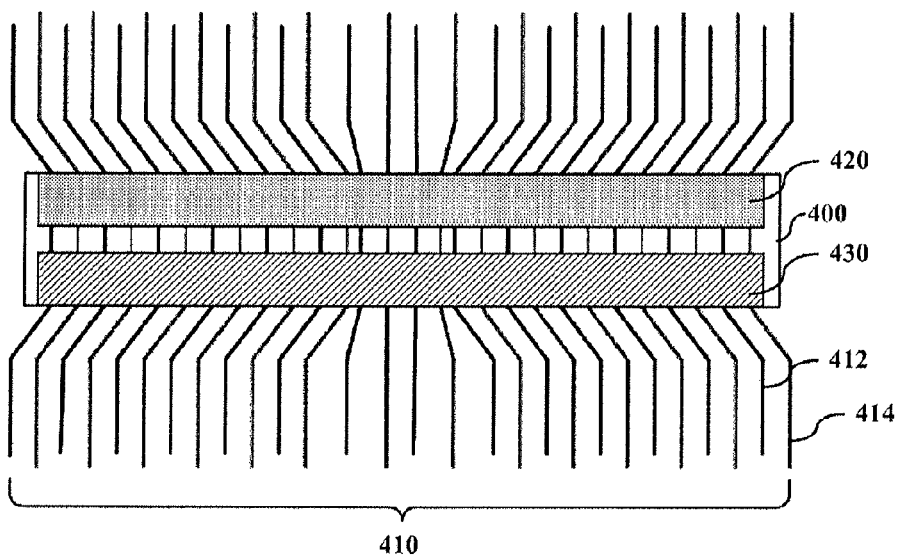

FIG. 15
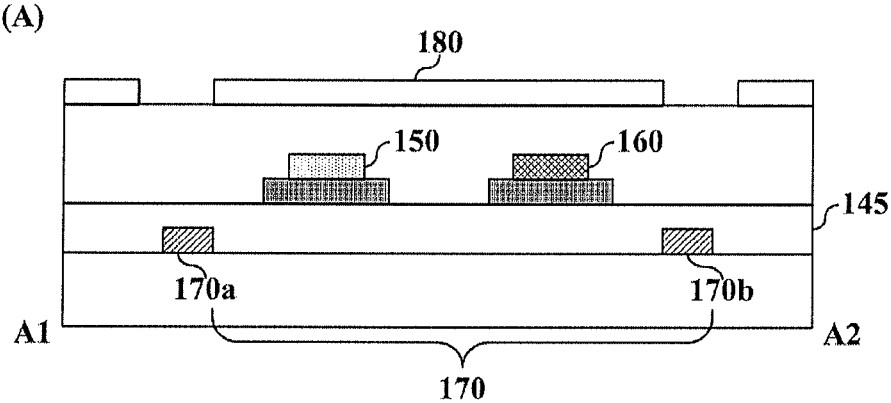
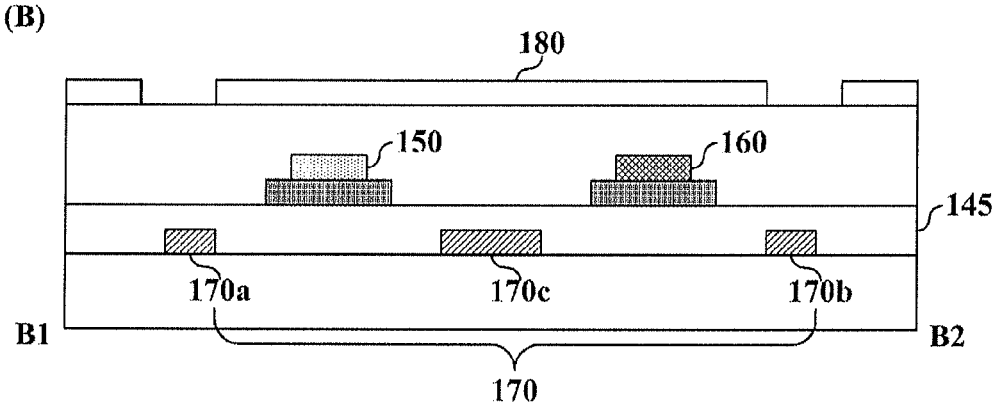

LIQUID CRYSTAL DISPLAY DEVICE WHEREIN EACH OF A PLURALITY OF FIRST GATE LINES IS SPACED APART FROM A CORRESPONDING DATA LINE WITH A COMMON VOLTAGE LINE THEREBETWEEN

CROSS-REFERENCE TO RELATED APPLICATIONS

This application claims the benefit of priority of Korean Patent Application No. 10-2012-0145533 filed on Dec. 13, 2012, which is hereby incorporated by reference as if fully set forth herein.

FIELD OF THE INVENTION

This disclosure relates to a flat panel display device. This disclosure also relates to a liquid crystal display (LCD) device with a reduced bezel size and an enhanced aesthetic design appearance.

DISCUSSION OF THE RELATED ART

With the advance of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, organic light emitting diode (OLED) display devices, etc. are developed as flat panel display (FPD) devices.

In such FPD devices, LCD devices are becoming increasingly prevalent because LCD devices can be readily manufactured as a result of advances in manufacturing technology that support low power consumption, a high-quality image, and a large screen.

FIG. 1 is a view schematically illustrating a related art LCD device, and FIG. 2 is a view schematically illustrating a pixel structure of the related art LCD device.

Referring to FIGS. 1 and 2, the related art LCD device includes a liquid crystal panel in which a plurality of pixels are arranged in a matrix type, a driving circuit unit that drives the liquid crystal panel, a backlight unit (not shown) that supplies light to the liquid crystal panel, and a bezel (not shown) that is formed to surround the liquid crystal panel and the driving circuit unit.

The liquid crystal panel can include a lower substrate (TFT array substrate) in which the plurality of pixels and a plurality of lines for driving the pixels are provided. Also, the liquid crystal panel can include an upper substrate (color filter array substrate) in which a plurality of color filters and a plurality of black matrixes are formed, and a liquid crystal layer disposed between the two substrates.

A plurality of gate lines and a plurality of data lines are formed to intersect each other in the lower substrate of the liquid crystal panel. The plurality of pixels are respectively formed in a plurality of areas in which the gate lines and the data lines intersect each other. A thin film transistor (TFT) and a switching element are formed in each of the pixels. Also, a pixel electrode and a common electrode for applying an electric field are formed in each of the pixels.

The liquid crystal panel includes a display area 10 that displays an image and a non-display area that cannot display an image.

A data driver 40 is connected to an upper non-display area of the liquid crystal panel. A pad area in which a plurality of pads receiving external signals for driving the respective pixels are provided, is formed in an outer non-display area of the lower substrate of the liquid crystal panel. Also, a link line that links a corresponding pad to a corresponding TFT and electrode is formed. A gate driver and the data driver 40 receive a plurality of different driving signals from a timing controller mounted on a printed circuit board (PCB) 50, and are driven with a driving voltage supplied from a power supply.

FIG. 3 is a sectional view illustrating the non-display area of the liquid crystal panel of the related art.

Referring to FIG. 3, a sealant 30 is formed in an outer portion (e.g., non-display area) of an active area in which the plurality of pixels are formed. The upper substrate 1 and the lower substrate 2 are coupled to each other with the sealant 30.

A gate-in panel (GIP) type of LCD device, in which a built-in shift register is disposed in the lower substrate 2, can be implemented to reduce the manufacturing cost of the LCD device. By adhering the driving circuit unit to the liquid crystal panel, volume and a weight can be reduced. By disposing a gate driver in each of left and right non-display areas of the liquid crystal panel in the GIP type, the pad area and link lines for applying signals to the respective gate lines of the liquid crystal panel are removed.

The GIP type gate driver is disposed in each of the left and right non-display areas of the lower substrate 2. In FIG. 3, only the gate driver disposed at a left side of the lower substrate 2 is illustrated, and the gate driver disposed at a right side of the lower substrate 2 is not illustrated.

The GIP type gate driver includes a common voltage link area 22 receiving a common voltage (Vcom), a ground (GND) link area 24, and a shift register logic area 26 that generates a scan signal for turning on the TFTs of the liquid crystal panel.

In comparison with an implementation where a separately manufactured gate driver chip is connected to the liquid crystal panel, the manufacturing cost of the LCD device can be reduced by applying the GIP type gate driver. Furthermore, a volume and a weight can be reduced. However, the GIP type gate driver may increase the bezel sizes of the left and right sides of the liquid crystal panel. As illustrated in FIG. 3, the ground link area 24 overlaps the sealant 30, for increasing a bezel size. However, in some implementations, the common voltage link area 22 is formed to have a width of about 1 mm, and the shift register logic area 26 of the GIP type gate driver is formed to have a width of 5 mm to 6 mm. For this reason, a left bezel width and a right bezel width are formed at 7 mm to 8 mm, thus causing an increased bezel size and a reduction in an aesthetic design appearance.

In the GIP type, there is a difficulty in decreasing a width of each line and an interval between adjacent lines to a certain level or less, and thus, there is a difficulty in realizing a narrow bezel. When the width of each line and the interval between the adjacent lines are reduced to decrease a bezel size, a line resistance increases causing distortions in line signals and malfunctions in the shift register logic.

To solve these problems, a structure was proposed in which the position in the TFT array substrate and the color filter array substrate are disposed is switched, i.e., where the TFT array substrate is disposed at an upper side. However, in this proposed implementation, external light is reflected by a plurality of lines formed in the TFT array substrate, causing a reduction in visibility of an image displayed by the liquid crystal panel.

SUMMARY

Accordingly, embodiments of the present invention are directed to provide a liquid crystal display (LCD) device that substantially obviates one or more problems due to limitations and disadvantages of the related art.

An aspect of the present invention is directed to provide an LCD device with a reduced size of a bezel formed at an outer portion of a liquid crystal panel.

Another aspect of the present invention is directed to provide an LCD device with a reduced size of a pad area.

Another aspect of the present invention is directed to provide an LCD device with reduced manufacturing costs.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by any combination of the exemplary structures provided in the written description, the claims hereof, as well as the appended drawings.

To achieve these and other advantages and in accordance with the purpose of the invention, as embodied and broadly described herein, there is provided an LCD device including: a plurality of first gate lines and a plurality of data lines vertically disposed in a liquid crystal panel; a plurality of second gate lines horizontally disposed in the liquid crystal panel, the plurality of second gate lines and the plurality of first gate lines being disposed on different layers; and a plurality of driving integrated circuits (ICs) disposed in an upper or lower non-display area of the liquid crystal panel, connected to the plurality of first gate lines to supply a scan signal, and connected to the plurality of data lines to supply data voltages, wherein the plurality of first gate lines and the plurality of second gate lines are electrically connected to each other in pairs through a contact in an overlapping area therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates multiple views of a driving integrated circuit (IC) of the LCD device according to an embodiment of the present invention;

FIG. 15 illustrates sectional views of respective pixels of FIGS. 13 and 14.

DETAILED DESCRIPTION OF THE INVENTION

Figure 1:
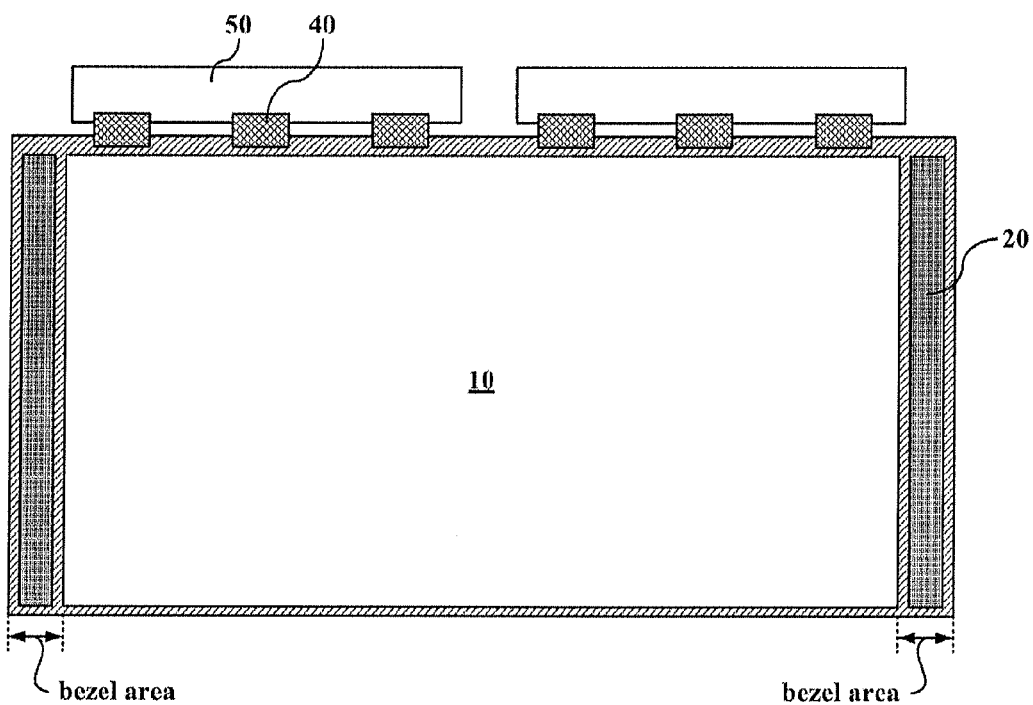
FIG. 1 schematically illustrates a related art LCD device.
Figure 2:
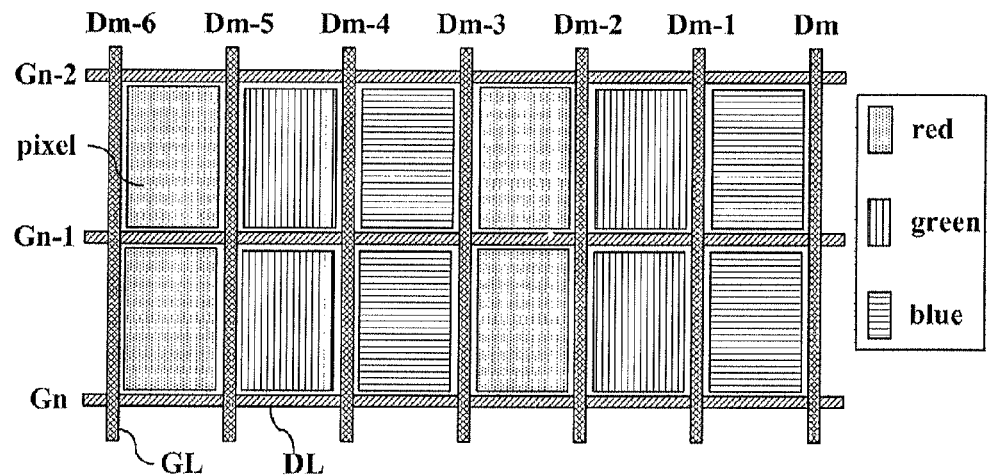
FIG. 2 schematically illustrates a pixel structure of the related art LCD device.
Figure 3:
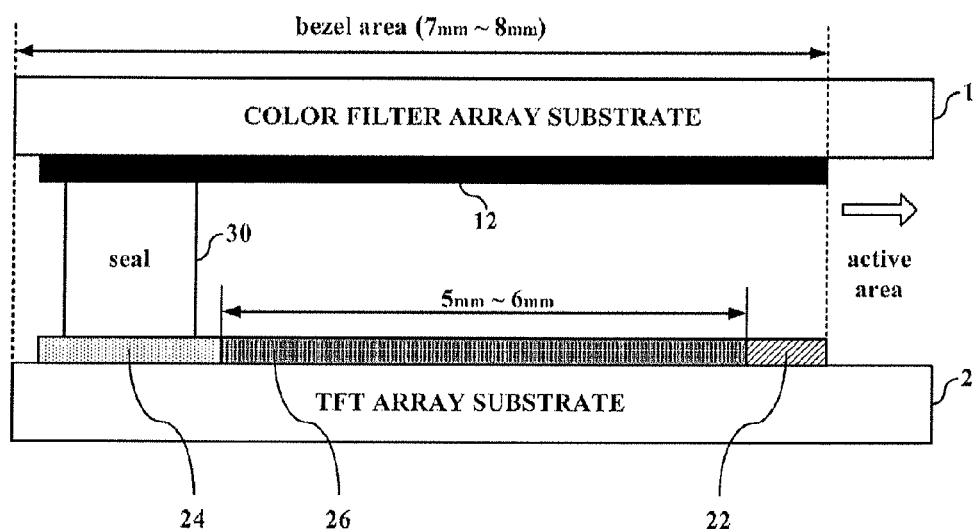
FIG. 3 illustrates a sectional view a non-display area of a related art liquid crystal panel.

In the specification, although illustrated in the drawing, it is noted that like reference numerals denote like elements in appreciating the drawings.

The terms described in the specification should be understood as follows. As used herein, the singular forms "a", "an" and "the" are intended to include the plural forms as well, unless the context clearly indicates otherwise. The terms first and second are for differentiating one element from the other element, and these elements should not be limited by these terms.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items.

In the description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

LCD devices have been developed in varying modes based on how the alignment of liquid crystals is adjusted. Examples of different modes include a twisted nematic (TN) mode, a vertical alignment (VA) mode, an in-plane switching (IPS) mode, and a fringe field switching (FFS) mode.

Among such modes, the IPS mode and the FFS mode are modes in which a plurality of pixel electrodes and a common electrode are arranged on a lower substrate, thereby adjusting the alignment of liquid crystal with electric fields between the pixel electrodes and the common electrode. An LCD device according to an embodiment of the present invention may be applied irrespective of modes, but the IPS mode will be described as one non-limiting example.

Next, an LCD device according to an embodiment of the present invention will be described in detail with reference to the accompanying drawings.

Figure 4:
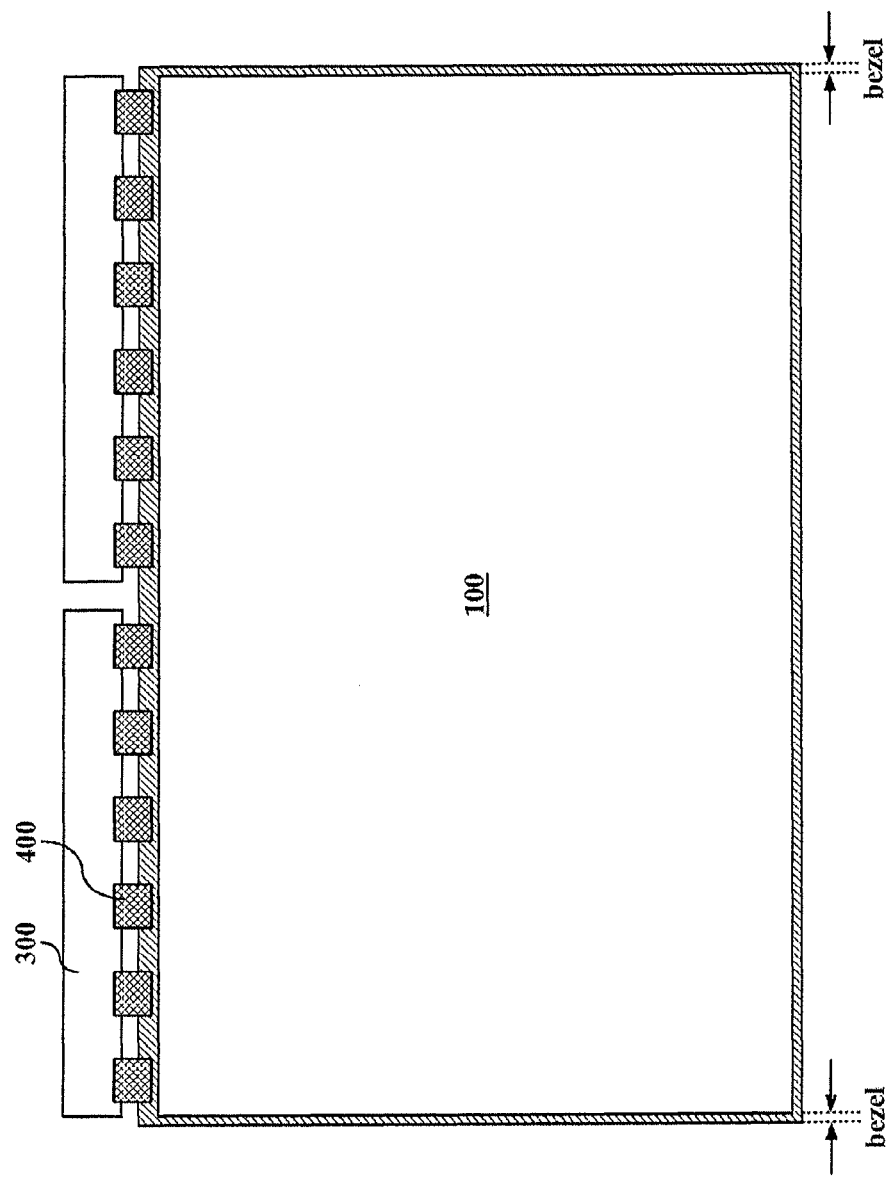
FIG. 4 schematically illustrates an LCD device according to an embodiment of the present invention.

FIG. 4 schematically illustrates an LCD device according to an embodiment of the present invention. Referring to FIG. 4, the LCD device includes a liquid crystal panel 100 in which a plurality of pixels are arranged in a matrix type, a plurality of driving ICs 400 for driving the liquid crystal panel 100, and a printed circuit board (PCB) 300 on which a control unit supplying a control signal for driving the plurality of driving ICs 400 and a power supply generating driving power are mounted. Also, the LCD device includes a backlight unit that supplies light to the liquid crystal panel 100, and a bezel and an external case that are provided to surround the liquid crystal panel 100 and a driving circuit unit. The liquid crystal panel 100 includes a display area (or active area) that can display an image and a non-display area that cannot display an image.

FIG. 5 illustrates multiple views of a driving IC of the LCD device according to an embodiment of the present invention. In FIG. 5, one of the plurality of driving ICs 400 is illustrated. The plurality of driving ICs 400 may be provided in a chip-on glass (COG) type or a chip-on film (COF, chip-on flexible printed circuit) type, for example.

Referring to view (A) in FIG. 5, the driving IC 400 of the LCD device includes gate driving logic and data driving logic merged into one chip. Referring to view (B) in FIG. 5, the driving IC 400 of the LCD device includes the data driving IC 420 and the gate driving IC 430, which are merged into one chip.

The data driving logic or the data driving IC 420 generates analog data voltages supplied to the respective pixels by using a data control signal and digital image data which are supplied by the control unit mounted on the PCB 300. The gate driving logic or the gate driving IC 430 generates a scan signal (gate signal) for turning on a plurality of TFTs formed in the respective pixels, by using a gate control signal supplied by the control unit mounted on the PCB 300.

A plurality of link lines 410 are formed at both sides of the driving IC 400. Here, the plurality of link lines 410 include a plurality of gate link lines 412 and a plurality of data link lines 414. The driving IC 400 receives the gate control signal from the control unit through the plurality of gate link lines 412, and generates the scan signal based on the gate control signal. The driving IC 400 supplies the generated scan signal to the pixels formed in the liquid crystal panel 100.

Moreover, the driving IC 400 receives the data control signal and the digital image data from the control unit through the data link lines 414, and generates analog data voltages on the basis of the data control signal and the digital image data. The driving IC 400 supplies the generated analog data voltages to the pixels formed in the liquid crystal panel 100.

The number of data lines DL formed in the liquid crystal panel 100 is not necessarily equal to the number of vertical gate lines (VGL). Accordingly, the number of gate link lines 412 may be different than the number of data link lines 414, and the gate link lines 412 and the data link lines 414 may or may not be alternately disposed. For example, two data link lines 414 may be provided in correspondence with one gate link line 412 depending on pitches and resolution of the pixels.

The driving IC 400 may be positioned at any position relative to the liquid crystal panel 100. For example, and as shown in FIG. 4, the driving IC 400 is positioned at the upper side of the liquid crystal panel 100, but is not limited thereto. As another example, the driving IC 400 may be positioned at the lower side of the liquid crystal panel 100.

Next, a structure of the liquid crystal panel 100 according to one embodiment of the present invention will be described in detail.

Figure 6:
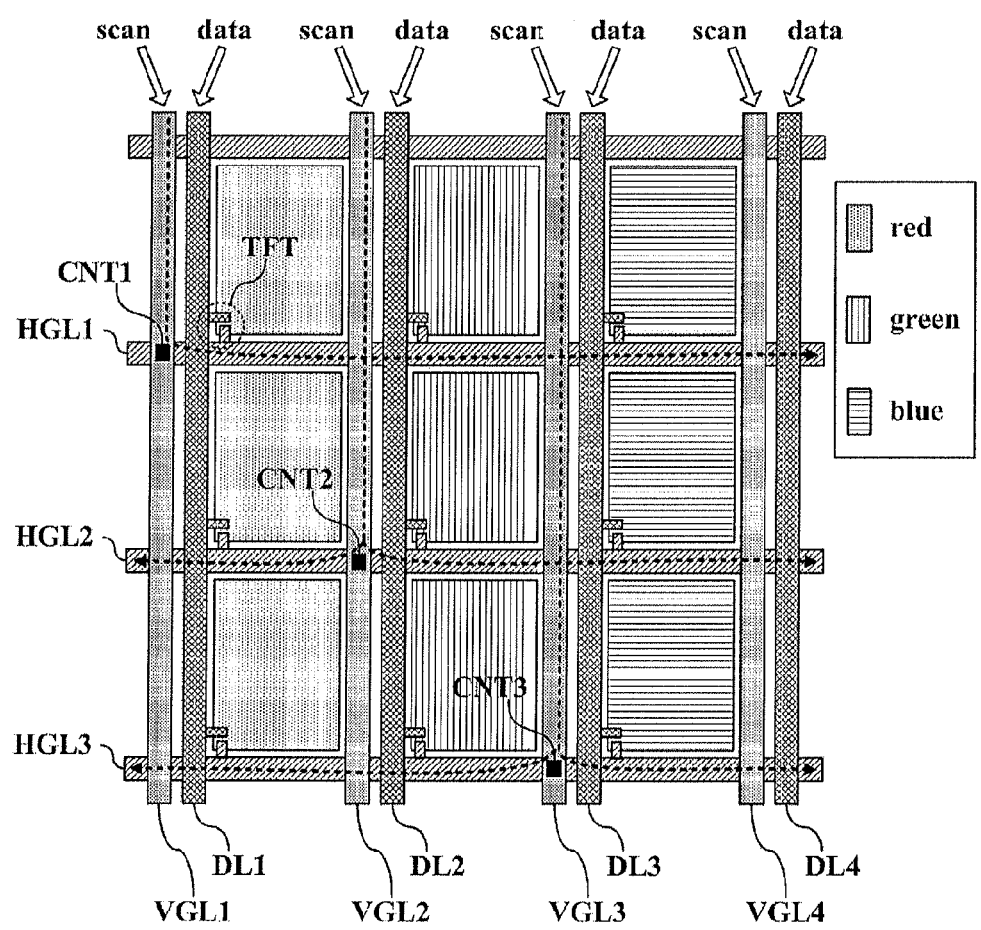
FIG. 6 illustrates a pixel structure of an LCD device according to a first embodiment of the present invention.
Figure 7:
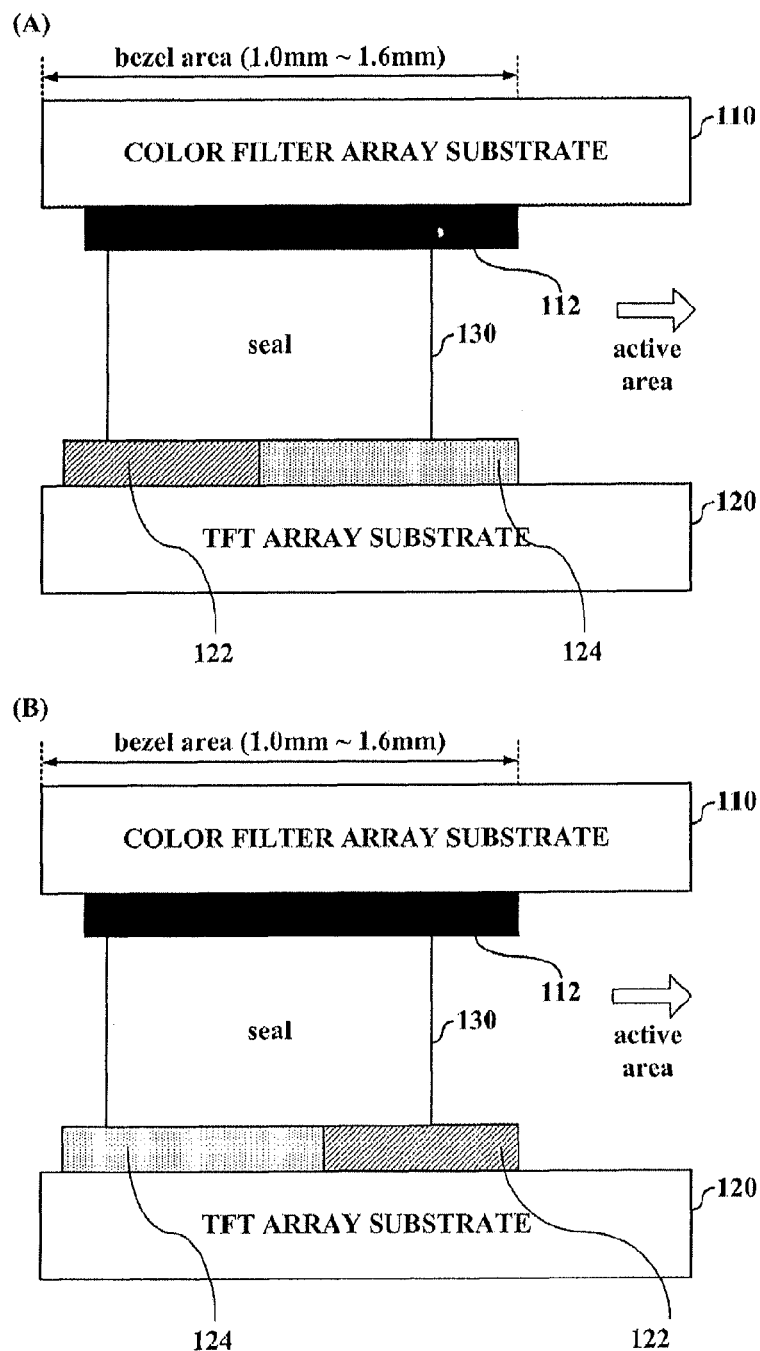
FIG. 7 illustrates a left bezel size of the LCD device according to an embodiment of the present invention.

FIG. 6 illustrates a pixel structure of an LCD device according to a first embodiment of the present invention. FIG. 7 illustrates a left portion of the LCD device according to an embodiment of the present invention.

Referring to FIG. 7, the liquid crystal panel 100 includes an upper substrate (color filter array substrate) 110, a lower substrate (TFT array substrate) 120, and a liquid crystal layer disposed between the two substrates 110 and 120. The upper substrate 110 and the lower substrate 120 are coupled to each other with a sealant 130. Views (A) and (B) of FIG. 7 shows embodiments a left portion of the liquid crystal panel 100, which is described in greater detail below. In views (A) and (B) of FIG. 7, the portion of the liquid crystal panel 100 within the bezel area forms a left non-display area of the liquid crystal panel 100.

The upper substrate 110 of the liquid crystal panel 100 may include a plurality of red (R), green (G), and blue (B) color filters for displaying a color image, and a black matrix 112 (BM) that is formed between adjacent pixels to divide the pixels. The color filters formed in an active area (display area) are not shown.

The lower substrate 120 of the liquid crystal panel 100 may include an active area (display area) in which the plurality of pixels for displaying an image are formed, and a non-display area in which a plurality of link lines linking the plurality of driving ICs 400 to the pixels are formed.

Turning to FIG. 6, a plurality of first gate lines VGL, a plurality of second gate lines HGL, and a plurality of data lines DL are formed in the active area of the lower substrate 120. As shown in FIG. 6, the plurality of first gate lines may be vertically disposed (e.g., vertical gate lines) and the plurality of second gate lines may be horizontally disposed (e.g., horizontal gate lines).

The plurality of pixels are defined by the plurality of vertical gate lines VGL, the plurality of horizontal gate lines HGL, and the plurality of data lines DL. Each of the pixels includes a common electrode that receives a common voltage (Vcom), a pixel electrode that receives data voltage (Vdata), a storage capacitor (Cst), and a TFT that is a switching element. Here, an active layer of the TFT may be formed of amorphous silicon (a-Si), low temperature poly silicon (LTPS), or indium gallium zinc oxide (IGZO), for example. The LCD device including the above-described elements changes alignment of liquid crystal with an electric field generated between paired pixel electrode and common electrode, and adjusts a transmittance of light supplied from the backlight unit by aligning the liquid crystal, thereby displaying an image.

Continuing discussion of FIG. 6, the plurality of vertical gate lines VGL and the plurality of data lines DL are formed in parallel across a vertical direction in the liquid crystal panel 100. That is, the plurality of vertical gate lines VGL are formed in the same direction and in parallel as the plurality of data lines DL. The plurality of second gate lines HGL are formed to intersect the plurality of first gate lines VGL and the plurality of data lines DL. That is, the plurality of gate lines HGL are formed in a horizontal direction.

In some implementations, the plurality of vertical gate lines VGL and the plurality of data lines are vertically formed from an upper side to a lower side (or vice versa) across a short-axis direction of the liquid crystal panel 100. The plurality of horizontal gate lines HGL are horizontally formed from a left side to a right side (or from a right side to a left side) across a long-axis direction of the liquid crystal panel 100.

In the LCD device according to the first embodiment of the present invention, the plurality of vertical gate lines VGL and the plurality of horizontal gate lines HGL are the same in number and share a one-to-one correspondence relationship.

The plurality of vertical gate lines VGL, the plurality of horizontal gate lines HGL, and the plurality of data lines DL may be formed on the same or different layers. As one example, the plurality of horizontal gate lines HGL are disposed on a first layer, and the plurality of vertical gate lines VGL and the plurality of vertically formed data lines DL are disposed on a second layer.

In FIG. 6, the plurality of vertical gate lines VGL and the plurality of horizontal gate lines HGL are disposed on different layers with an insulating layer therebetween. The plurality of vertical gate lines VGL and the plurality of horizontal gate lines HGL are selectively brought into contact with each other through a contact CNT in an overlapping area therebetween. That is, the plurality of vertical gate lines VGL and the plurality of horizontal gate lines HGL are electrically connected to each in pairs through a contact CNT in the overlapping area therebetween.

To illustrate, a vertically formed first-order first gate line VGL1 and a horizontally formed first-order second gate line HGL1 in FIG. 6 are electrically connected to each other through a first contact CNT1 in an overlapping area therebetween. In this way, a vertical gate line and horizontal gate line pair, e.g., the first-order vertical gate line VGL1 and the first-order horizontal gate line HGL1, are electrically connected to each other through the first contact CNT1. The terms first-order, second-order, third-order, etc. may refer to an order and relationship between a plurality of lines. For example, the terms first-order, second-order, and third-order may refer to the ordering or relationship of lines or line pairs in one of the drawings of the present disclosure.

Continuing, a vertically formed second-order first gate line VGL2 and a horizontally formed second-order second gate line HGL2 are electrically connected to each other through a second contact CNT2 in an overlapping area therebetween. The vertically formed third-order vertical gate line VGL3 and the horizontally formed third-order horizontal gate line HGL3 are electrically connected to each other through a third contact CNT3 in an overlapping area therebetween.

Accordingly, the plurality of vertical gate lines VGL and the plurality of horizontal gate lines HGL are selectively paired and brought into contact through a contact CNT in an overlapping area therebetween. That is, 'n' number of vertical gate lines VGL and 'n' number of horizontal gate lines HGL are paired and electrically connected to each other through a contact, e.g., when the number of vertical gate lines VGL and the number of horizontal gate lines HGL are equal.

The plurality of vertical gate lines VGL are respectively connected to the plurality of gate link lines 412 illustrated in FIG. 5. Thus, the scan signal output from the driving IC 400 is applied to the plurality of vertical gate lines VGL. The scan signal is supplied to the TFTs of the pixels formed in the liquid crystal panel 100 via the plurality of horizontal gate lines HGL connected to the plurality of vertical gate lines VGL through a respective contact CNT, thereby turning on (e.g., activating) the TFTs. The scan signal may be sequentially supplied to all the pixels of the liquid crystal panel 100 one horizontal line at a time, e.g., by applying the scan signal to a corresponding vertical gate line.

The plurality of data lines DL are respectively connected to the plurality of data link lines 414 illustrated in FIG. 5. Thus, data voltages (Vdata) output from the driving IC 400 are applied to the respective data lines DL. When a data voltage (Vdata) is supplied to a source electrode of a specific TFT formed in the liquid crystal panel 100 via a corresponding data line DL to turn on the TFT, the data voltage (Vdata) supplied to the source electrode is supplied to a pixel electrode via a drain electrode.

By applying the scan signal to a pixel through a vertical gate line VGL and applying a data voltage (Vdata) to the pixel through a vertically formed data line DL, the liquid crystal panel 100 can operate without a link line and GIP logic in the left and right non-display areas. Accordingly, the right and left non-display portions of the liquid crystal panel 100 may not include a link line and GIP logic. That is, the right and left non-display portions of the liquid crystal panel 100 may be implemented without link lines and GIP logic, thus decreasing the size of the non-display area.

Returning to FIG. 7, the left non-display area may include a common voltage link area 122 and a ground link area 124 and may be implemented without link lines, GIP logic, or other gate driving logic. A similar configuration may be implemented in the right non-display area as well. In some implementations, this reduced complexity in the left and right non-display areas may decrease the non-display area width or a bezel width to 1.0 mm to 1.6 mm.

Views (A) and (B) of FIG. 7 illustrate two exemplary design options for a left side of a liquid crystal panel 100. Here, as illustrated in view (A) of FIG. 7, the common voltage link area 122 may be formed on the outside of the ground voltage link area 124 and overlapping with the sealant 130. As illustrated in view (B) of FIG. 7, the ground voltage link area 124 may be formed on the outside of the common voltage link area 122 and overlapping with the sealant 130. Also, the common voltage link area 122 and the ground voltage link area 124 are formed to have a minimum of bezel width margin necessary (or other reduced width) for coupling of the upper substrate 110 and the lower substrate 120, thereby narrowing the width of the bezel. The design options presented in FIG. 7 may also be consistently implemented on the right side of the liquid crystal panel 100 as well.

Figure 8:
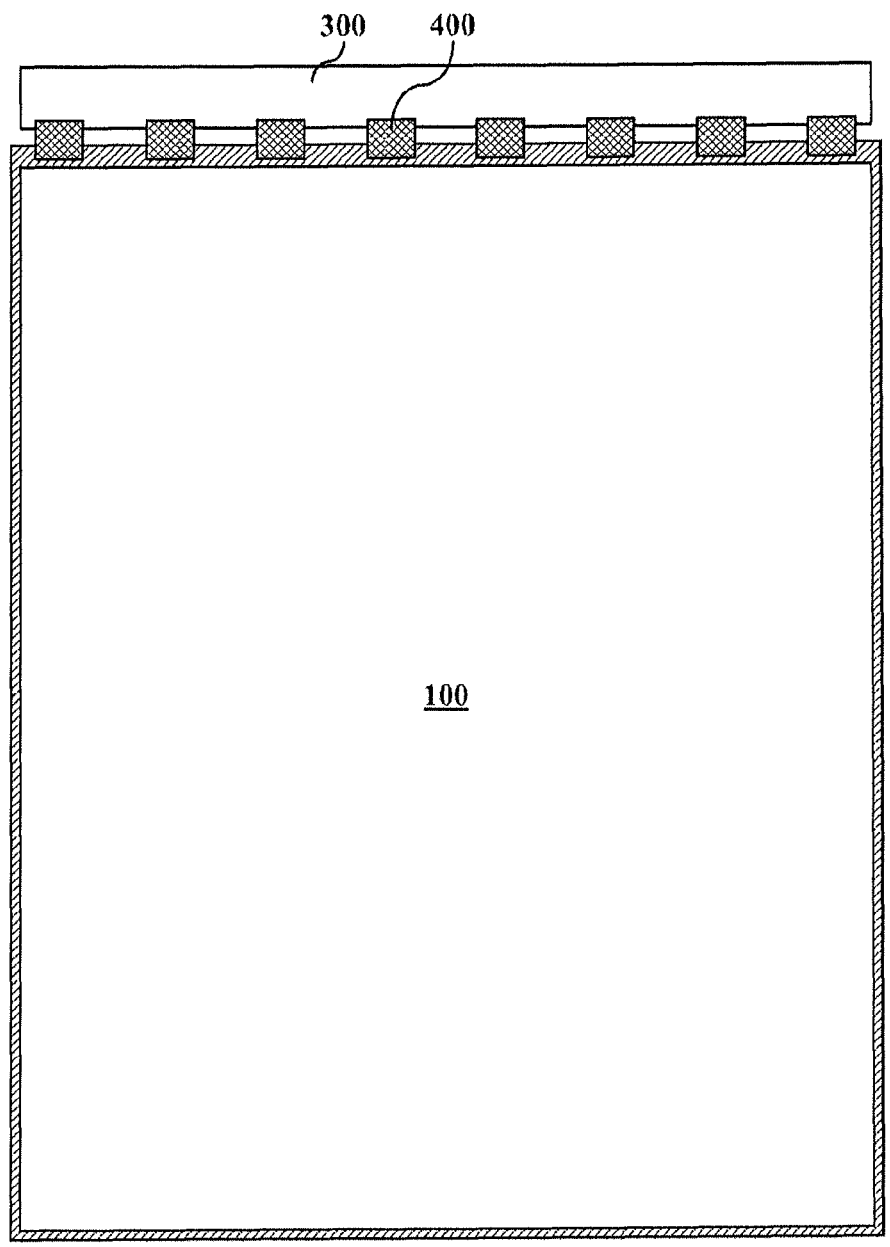
FIG. 8 illustrates a liquid crystal panel in another embodiment of the present invention.

FIG. 8 illustrates a liquid crystal panel 100 implemented with a longer vertical axis and a shorter horizontal axis according to another embodiment of the present invention.

Referring to FIG. 8, the liquid crystal display 100 may be implemented to have a display area with a greater vertical length than horizontal length. In FIG. 8, the plurality of driving ICs 400 are disposed at the upper side of the liquid crystal panel 100. The plurality of first gate lines VGL and the plurality of data lines DL are vertically formed from the upper side to the lower side across the long-axis direction of the liquid crystal panel 100. The plurality of second gate lines HGL are horizontally formed from the left side to the right side (or from the right side to the left side) across the short-axis direction of the liquid crystal panel 100.

Contacts between the plurality of vertical gate lines VGL and the plurality of horizontal second gate lines HGL may be made as similarly described above with respect to FIG. 6. And as similarly described above, the liquid crystal display 100 is implemented without, and operates without, link lines and GIP logic in the left and right non-display areas.

Accordingly, the left non-display area of the liquid crystal panel 100 is formed with the common voltage link area 122 and the ground link area 124, but without link lines, GIP logic, and/or other gate driving logic. The right non-display area of the liquid crystal panel 100 may be similarly formed. As such, this implementation may reduce the bezel width and/or non-display area width to 1.0 mm to 1.6 mm, for example.

Figure 9:
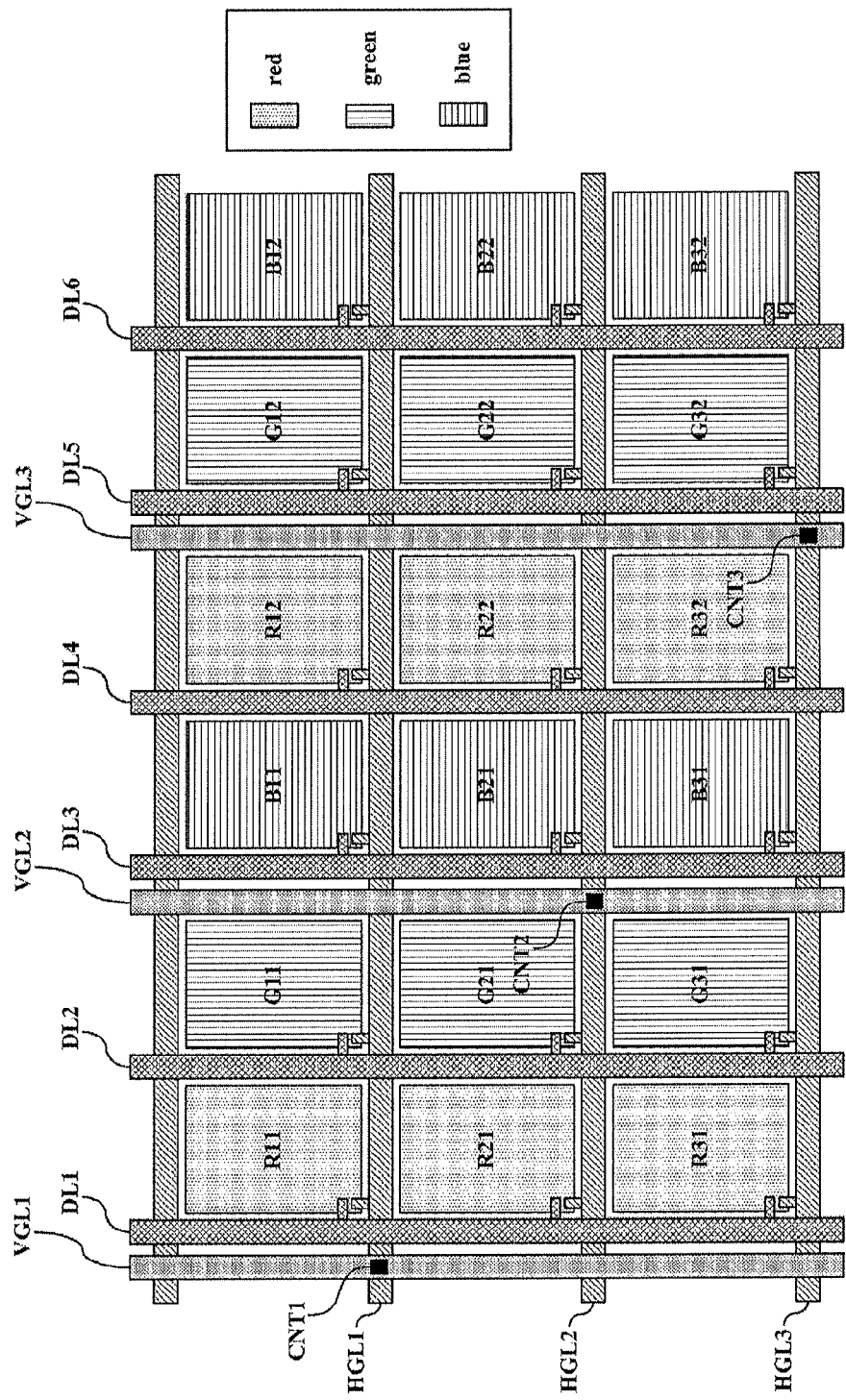
FIG. 9 illustrates a pixel structure of an LCD device according to a second embodiment of the present invention.

FIG. 9 is a view illustrating a pixel structure of an LCD device according to a second embodiment of the present invention.

Referring to FIG. 9, a disposition structure of the first gate lines VGL, second gate lines HGL, and data lines DL for driving the pixels formed in the liquid crystal panel 100 varies from the first embodiment presented above.

In the above-described first embodiment, the plurality of vertical gate lines VGL and the plurality of data lines DL are formed of the same number in one-to-one correspondence relationship. In the second embodiment of FIG. 9, the plurality of vertical gate lines VGL are formed to be half of the number of data lines DL. Any number of other ratios between the number of vertical gate lines VGL and data lines DL are contemplated.

Specifically in FIG. 9, the first-order vertical gate line VGL1 is disposed in parallel with and next to the first-order data line DL1, and the second-order vertical gate line VGL2 is disposed in parallel with and next to the third-order data line DL3. Also, the third-order vertical gate line VGL3 is disposed in parallel with and next to a fifth-order data line DL5. Like this, the plurality of vertical gate lines VGL and the plurality of data lines DL are arranged in a two-data line and one-gate line (2DIG) pixel structure.

In the example shown in FIG. 9, the plurality of horizontal gate lines HGL are disposed on the first layer, and the vertically formed plurality of vertical gate lines VGL and plurality of data lines DL are disposed on the second layer. The plurality of vertical gate lines VGL and the plurality of horizontal gate lines HGL are disposed on different layers with an insulating layer therebetween. However, the plurality of vertical gate lines VGL and the plurality of horizontal gate lines HGL are selectively brought into contact with each other through respective contacts CNT in the overlapping area therebetween.

Specifically, the first-order vertical gate line VGL1 and the first-order horizontal gate line HGL1 are electrically connected to each other in the overlapping area therebetween through the first contact CNT1 shown in FIG. 9. In this way, a vertical gate line and horizontal gate line pair, namely, the first-order vertical gate line VGL1 and the first-order horizontal gate line HGL1 are electrically connected to each other through the first contact CNT1.

The second-order vertical gate line VGL2 and a second-order horizontal gate line HGL2 are electrically connected to each other in the overlapping area therebetween through the second contact CNT2 shown in FIG. 9. The third-order vertical gate line VGL3 and the third-order horizontal gate line HGL3 are electrically connected to each other through the third contact CNT3 shown in FIG. 9.

Thus, as shown in the connection structure shown in FIG. 9, 'n' number of vertical gate lines VGL and 'n' number of horizontal gate lines HGL can be paired and electrically connected to each other through a respective contact.

The plurality of vertical gate lines VGL may be respectively connected to the plurality of gate link lines 412 illustrated in FIG. 5. Thus, the scan signal output from the driving IC 400 can be applied to the plurality of vertical gate lines VGL. And as the plurality of vertical gate lines VGL are respectively connected to the plurality of horizontal gate lines, a scan signal output to a particular vertical gate line may also be supplied to a particular horizontal gate line. The plurality of vertically formed data lines DL may be respectively connected to the plurality of data link lines 414 illustrated in FIG. 5. Thus, data voltages (Vdata) output from the driving IC 400 are applied to the respective data lines DL.

In the LCD device according to the second embodiment of the present invention illustrated in FIG. 9, the left non-display area of the liquid crystal panel 100 is formed with the common voltage link area 122 and the ground link area 124, but without link lines, GIP logic, and/or other gate driving logic. The right non-display area of the liquid crystal panel 100 may be similarly formed. As such, this implementation may reduce the bezel width and/or non-display area width to 1.0 mm to 1.6 mm, for example.

As illustrated in FIG. 9, by disposing the vertical gate lines VGL and the data lines DL in the 2DIG pixel structure, the LCD device according to the second embodiment can realize all advantages of the LCD device of FIG. 6. Furthermore, according to the second embodiment, an aperture ratio of the liquid crystal panel 100 can be enhanced through the 2:1 ratio of data lines DL to vertical gate lines VGL.

Figure 10:
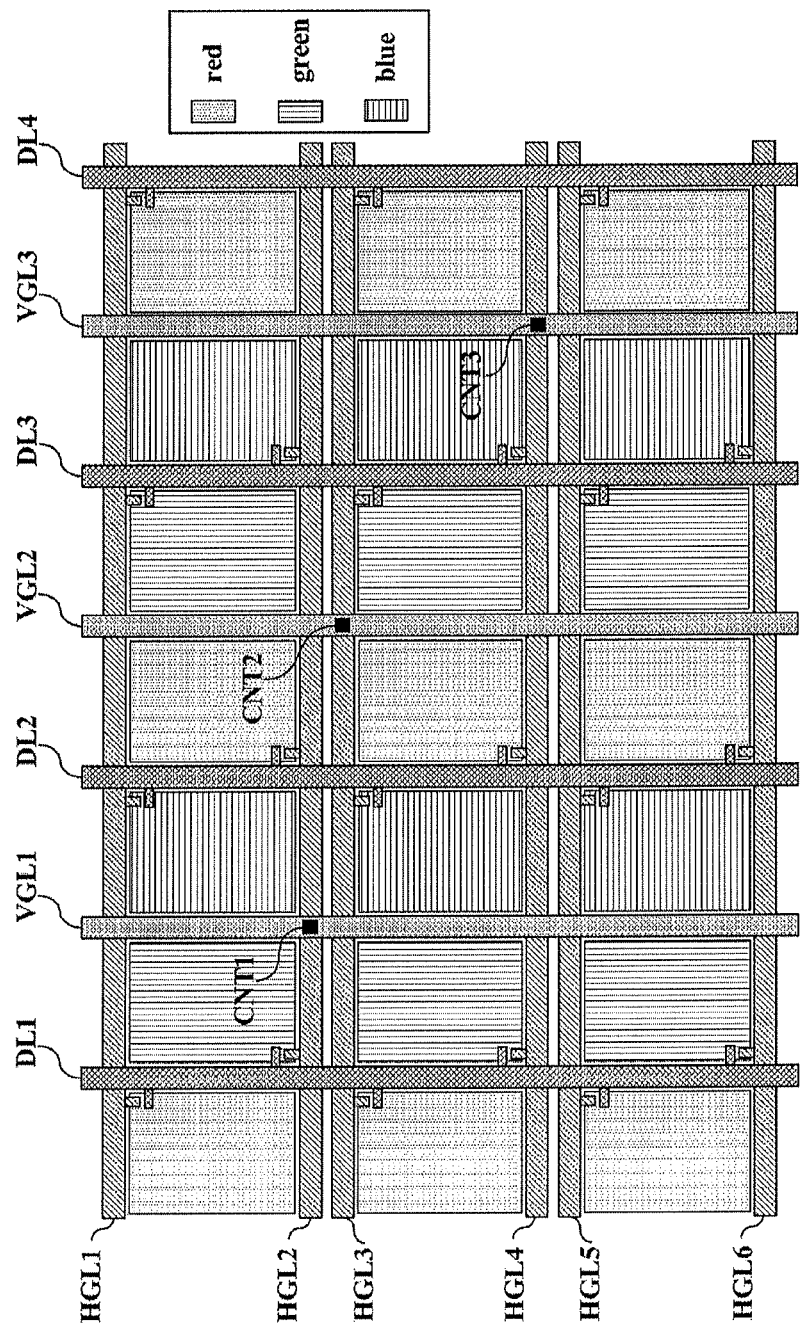
FIG. 10 illustrates a pixel structure of an LCD device according to a third embodiment of the present invention.

FIG. 10 is a view illustrating a pixel structure of an LCD device according to a third embodiment of the present invention.

Referring to FIG. 10, another disposition structure of the vertical gate lines VGL, horizontal gate lines HGL, and data lines DL for driving the pixels formed in the liquid crystal panel 100 is presented.

In the third embodiment of the present invention illustrated in FIG. 10, the non-display area width of the liquid crystal panel 100 (e.g., the left bezel width and right bezel width of the liquid crystal panel 100) can be further reduced by applying the vertical gate lines VGL in a double reduced data (DRD) pixel structure.

In the DRD pixel structure, data voltages are respectively supplied to pixels (which are arranged in two rows) through one data line, namely, two pixels share one data line, and thus, two gate lines are applied for separately driving two pixels. Namely, the number of gate lines increases by two times in comparison with vertical resolution.

Here, a plurality of the vertical gate lines VGL are disposed in respective spaces between a plurality of pixels in which a data line DL is not formed and/or provided.

Specifically as illustrated in FIG. 10, the first-order vertical gate line VGL1 is disposed between the first-order data line DL1 and the second-order data line DL2. The second-order vertical gate line VGL2 is disposed between the second-order data line DL2 and the third-order data line DL3. Also, the third-order vertical gate line VGL3 is disposed between the third-order data line DL3 and the fourth-order data line DL4.

Like this, in the DRD pixel structure, the plurality of vertical gate lines VGL are disposed. In a consistent manner as described above, the plurality of vertical gate lines VGL and the plurality of horizontal gate lines HGL are selectively brought into contact with each other through a respective contact CNT, thereby supplying the scan signal to the pixels. Here, the plurality of horizontal gate lines HGL are disposed on a first layer, and the plurality of vertical gate lines VGL and the plurality of data lines DL are disposed on a second layer.

In a connection structure consistent with or similar to the above-described embodiments, 'n' number of vertical gate lines VGL and 'n' number of horizontal gate lines HGL can be paired and electrically connected to each other through a respective contact in the overlapping area therebetween.

The plurality of vertical gate lines VGL shown in FIG. 10 may be respectively connected to the plurality of gate link lines 412 illustrated in FIG. 5. Thus, the scan signal output from the driving IC 400 is applied to the plurality of vertical gate lines VGL. The plurality of data lines DL may be respectively connected to the plurality of data link lines 414 illustrated in FIG. 5. Thus, data voltages (Vdata) output from the driving IC 400 are applied to the respective data lines DL.

In the LCD device according to the third embodiment of the present invention illustrated in FIG. 10, the left non-display area of the liquid crystal panel 100 is formed with the common voltage link area 122 and the ground link area 124, but without link lines, GIP logic, and/or other gate driving logic. The right non-display area of the liquid crystal panel 100 may be similarly formed. As such, this implementation may reduce the bezel width and/or non-display area width to 1.0 mm to 1.6 mm, for example.

As illustrated in FIG. 10, by disposing the plurality of vertical gate lines VGL and the plurality of data lines DL in the DRD pixel structure, the non-display area of the liquid crystal panel 100 (e.g., left bezel area width and right bezel area width) can be reduced without loss of an aperture ratio compared to the existing DRD pixel structure.

Figure 11:
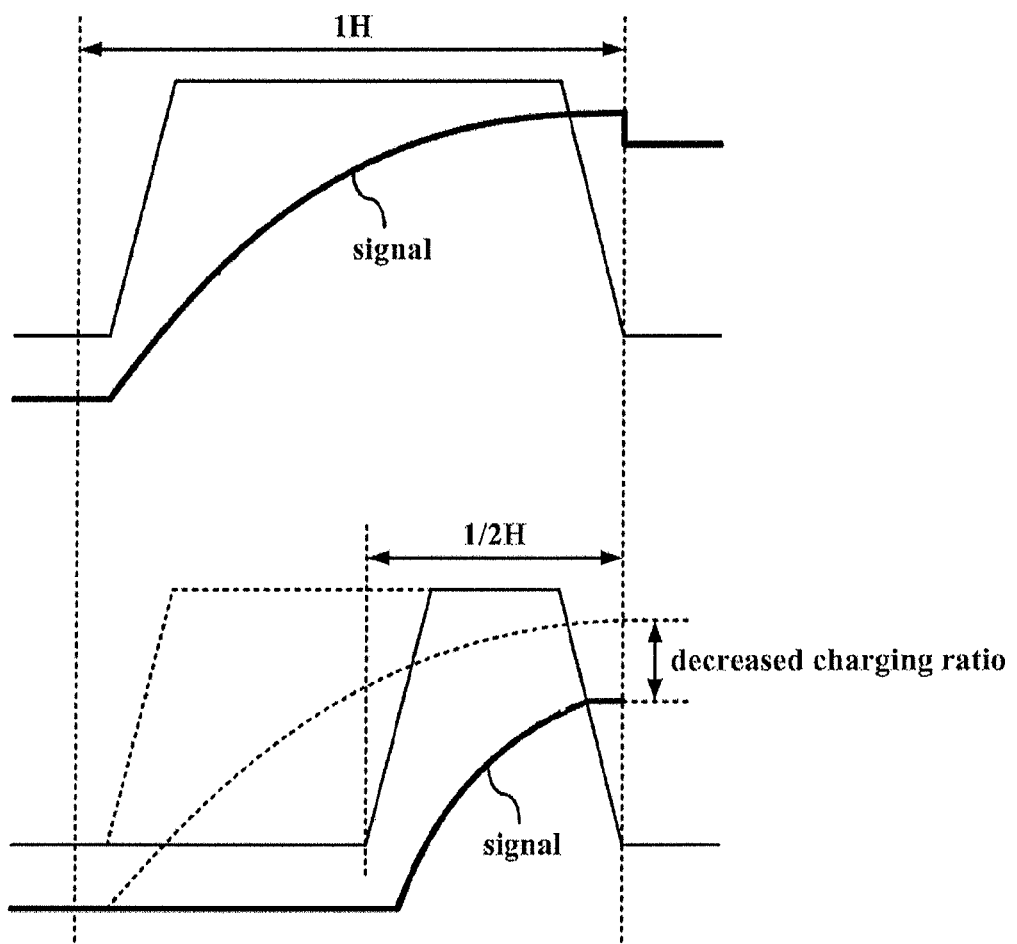
FIG. 11 illustrates a charging time of signals supplied to respective pixels in a DRD pixel structure according to an embodiment of the present invention.

FIG. 11 illustrates a charging time of signals supplied to respective pixels in the DRD pixel structure according to an embodiment of the present invention.

Referring to FIG. 11, by disposing the vertical gate lines VGL in the DRD pixel structure of FIG. 10, an LCD device with a narrower bezel and/or non-display area can be provided without loss of an aperture ratio of each pixel. Due to a driving characteristic of the DRD pixel structure, a pixel charging time and gate falling time of each of pixel driven during one horizontal (1H) period is shortened by (e.g., by half), and can reduce a charging ratio for the pixel.

Figure 12:
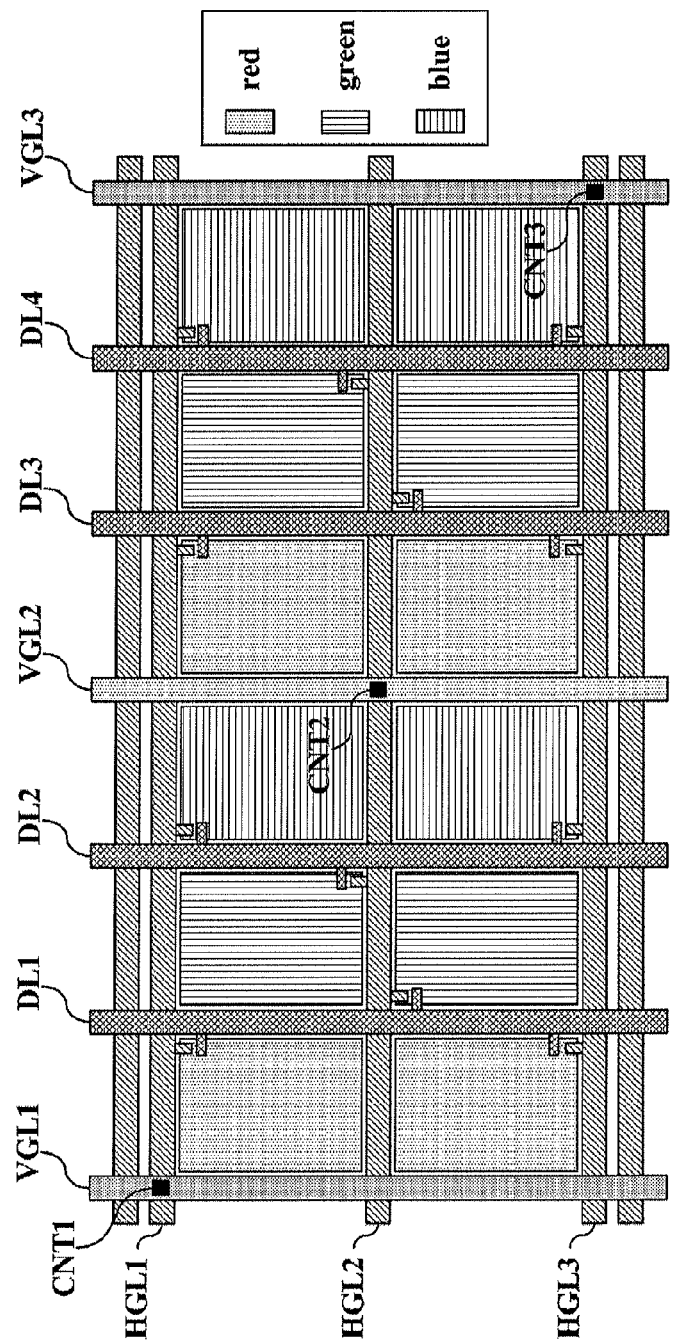
FIG. 12 illustrates a pixel structure of an LCD device according to a fourth embodiment of the present invention.

FIG. 12 is a view illustrating a pixel structure of an LCD device according to a fourth embodiment of the present invention.

Referring to FIG. 12, another disposition structure of the vertical gate lines VGL, horizontal gate lines HGL, and data lines DL for driving the pixels formed in the liquid crystal panel 100 is presented.

The disposition structure illustrated in FIG. 12 can increase a pixel charging time, by about 33% in some implementations in comparison to other DRD pixel structures. Also, the disposition structure illustrated in FIG. 12 can also realize the reduced non-display area benefits described above, as the left bezel width and right bezel width of the liquid crystal panel 100 can be reduced by applying the scan signal to the vertical gate lines VGL.

In FIG. 12, a pixel structure is designed such that two data lines DL are disposed, and then one vertical gate line VGL is disposed following the two data lines DL, e.g., in a data-data-gate disposition. Put another way, one vertical gate line VGL may be disposed, and then two data lines DL may be disposed one each side of the vertical gate line VGL.

The DRD pixel structure in FIG. 12 may reduce the number of horizontal gate lines HGL in the liquid crystal panel 100. For example, in the DRD pixel structure of FIG. 10, two horizontal gate lines HGL are disposed for driving each row of pixels. As one example, a total of 2,160 horizontal gate lines HGL is provided in the DRD pixel structure of FIG. 10. In the DRD pixel structure of FIG. 12, two horizontal gate lines HGL may be disposed for driving for a first row of pixels and one horizontal gate line HGL may be disposed for driving a second row of pixels following the first row. In that regard, the DRD pixel structure of FIG. 12 may provide three horizontal gate lines HGH for driving two rows of pixels. Thus, the DRD pixel structure of FIG. 12 may drive the pixels of a liquid crystal display with a total of 1,620 horizontal gate lines HGL instead of the 2,160 horizontal gate lines HGL for the DRD pixel structure of FIG. 10.

By applying the pixel structure of FIG. 12, the number of horizontally formed second gate lines HGL can decrease by about one-third compared to the DRD pixel structure of FIG. 10, and a pixel charging time can be increased by approximately 33%.

Similarly as discussed above, the plurality of vertical gate lines VGL and the plurality of horizontal gate lines HGL are selectively brought into contact with each other through a contact CNT, thereby supplying the scan signal to the pixels. The plurality of horizontal gate lines HGL are disposed on the first layer. The plurality of vertical gate lines VGL and the plurality of data lines DL are disposed on the second layer. In a scheme equal or similar to the above-described embodiments, 'n' number of vertical gate lines VGL and 'n' number of horizontal gate lines HGL are paired and electrically connected to each other through the contact.

The plurality of vertical gate lines VGL are respectively connected to the plurality of gate link lines 412 illustrated in FIG. 5. Thus, the scan signal output from the driving IC 400 is applied to the plurality of first gate lines VGL. The plurality of data lines DL are respectively connected to the plurality of data link lines 414 illustrated in FIG. 5. Thus, data voltages (Vdata) output from the driving IC 400 are applied to the respective data lines DL.

In the LCD device according to the fourth embodiment of the present invention illustrated in FIG. 12, the left non-display area of the liquid crystal panel 100 is formed with the common voltage link area 122 and the ground link area 124, but without link lines, GIP logic, and/or other gate driving logic. The right non-display area of the liquid crystal panel 100 may be similarly formed. As such, this implementation may reduce the bezel width and/or non-display area width to 1.0 mm to 1.6 mm, for example.

Figure 13:
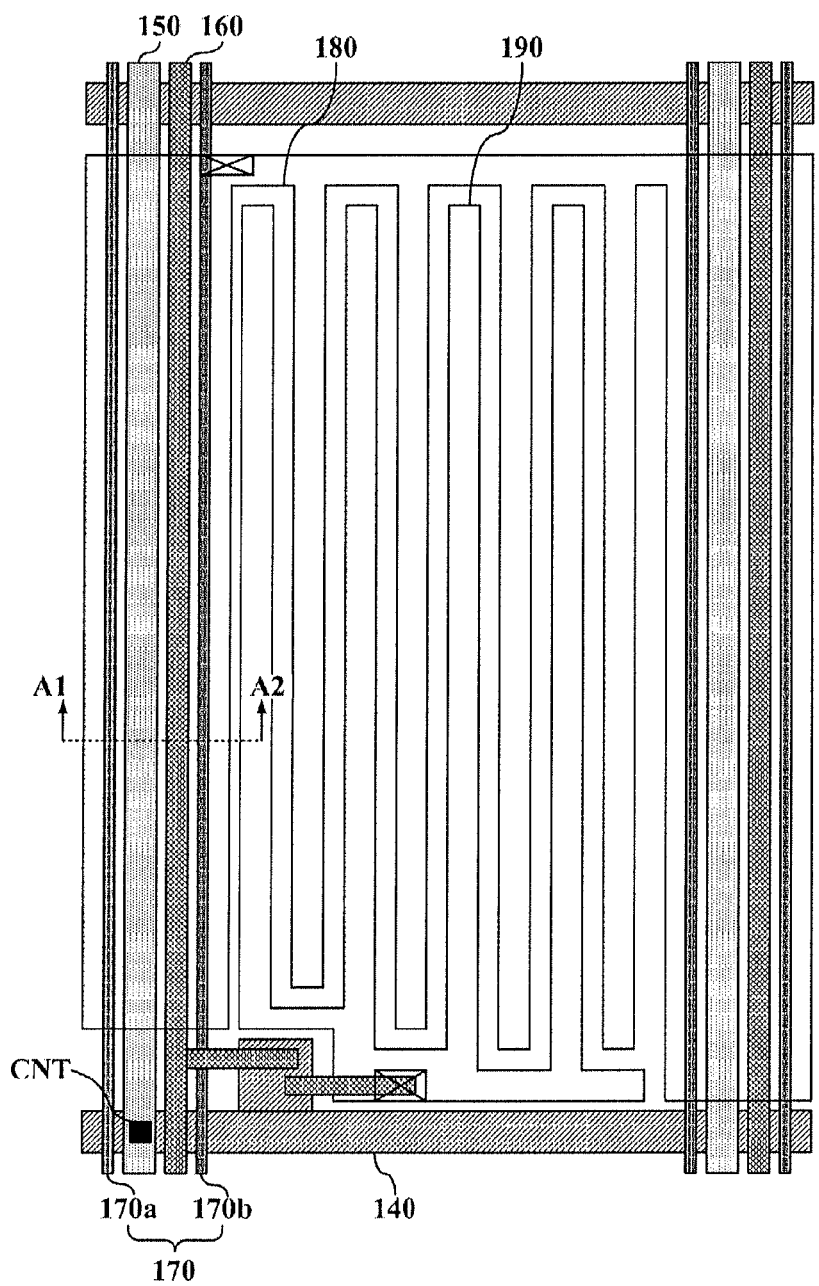
FIG. 13 illustrates in detail a pixel structure of an LCD device according to an embodiment of the present invention.
Figure 14:
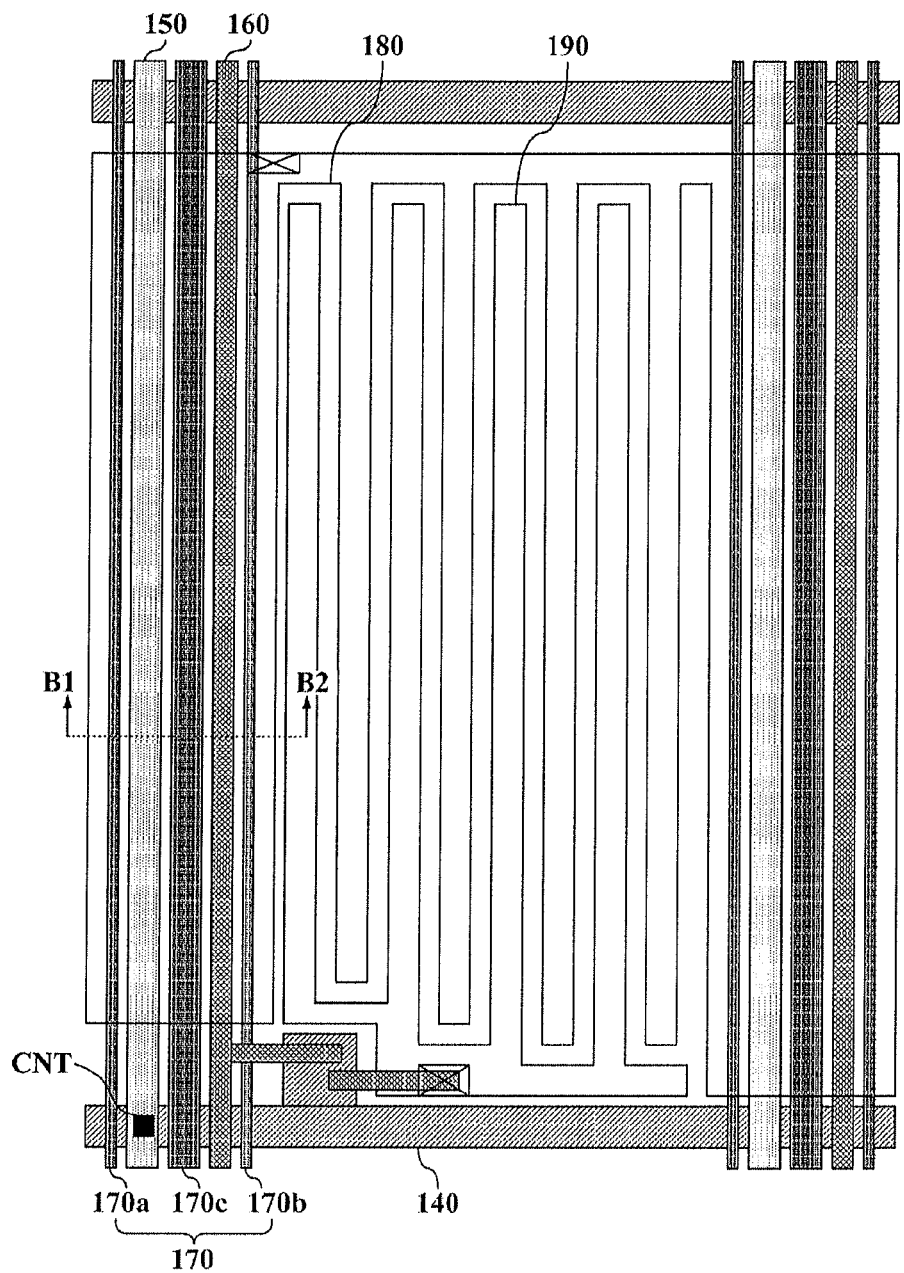
FIG. 14 illustrates in detail a pixel structure of an LCD device according to an embodiment of the present invention.

FIGS. 13 and 14 illustrate a pixel structure of an LCD device according to an embodiment of the present invention, and FIG. 15 illustrates sectional views of respective pixels of FIGS. 13 and 14. In FIGS. 13 and 14, it is illustrated that the pixels have a single domain and a square and rectangular shape, but is not limited thereto. The pixels may be formed to have a multi-domain.

First, referring to FIG. 13 and view (A) of FIG. 15, a common electrode 180 receiving the common voltage (Vcom) and a pixel electrode 190 receiving a data voltage (Vdata) are formed in each pixel of the liquid crystal panel 100. In view (A) of FIG. 15, only the common electrode 180 is illustrated, and the pixel electrode 190 formed on the common electrode 180 is not illustrated.

In FIG. 13, a pixel structure driven in the FFS mode is illustrated, and the common electrode 180 and the pixel electrode 190 are disposed on different layers. One of the common electrode 180 and pixel electrode 190 may be patterned in a shape including a plurality of slits, and the other may be formed in a flat plate shape. In FIG. 13, the common electrode 180 being patterned in a shape with a slit is illustrated as an example.

A horizontal gate line 140 is provided in a width direction (X-axis direction), and a data line 160 and a vertical gate line 150 are provided in a length direction (Y-axis direction). As illustrated in view (A) of FIG. 15, the data line 160 and the vertical gate line 150 are disposed on the same layer, and the horizontal gate line 140 and the vertical gate line 150 are disposed on different layers.

Referring again to FIG. 13, two common voltage lines 170 labeled as 170a and 170b apply the common voltage (Vcom) to the common electrode 180 of each pixel. The vertical gate line 150 and data line 160 are disposed in parallel with and between the two common voltage lines 170a and 170b. As seen in FIG. 13, a first common voltage line 170a is disposed next to the vertical gate line 150, and a second common voltage line 170b is disposed next to the data line 160.

Although the first and second common voltage lines 170a and 170b are separated from each other, the first and second common voltage lines 170a and 170b contact a common line (not shown) which is formed in parallel and in the same direction as the horizontal gate line 140. Accordingly, the same common voltage (Vcom) is supplied to the first and second common voltage lines 170a and 170b.

Here, the common voltage lines 170 and the vertical gate line 150 and data line 160 are disposed on different layers with an insulating layer 145 therebetween.

FIG. 14 presents another pixel structure according to an embodiment of the present invention, which may reduce a leakage of light that can occur in pixels, and more accurately display a black image and/or increase a contrast ratio. Referring to FIGS. 14 and 15B, common voltage lines 170 labeled as 170a, 170b, and 170c for applying the common voltage (Vcom) to the common electrode 180 of pixels are vertically disposed in parallel to the vertical gate line 150 and data line 160.

The first common voltage line 170a is disposed next to the vertical gate line 150, and the second common voltage line 170b is disposed next to the data line 160. Also, a third common voltage line 170c is disposed between the vertical gate line 150 and the data line 160. That is, in the pixel structure of FIG. 13, the third common voltage line 170c is disposed between the vertical gate line 150 and the data line 160.

Although the first to third common voltage lines 170a to 170c are separated from each other, the first to third common voltage lines 170a to 170c contact a common line (not shown) which is formed in parallel and in the same direction as the horizontal gate line 140. Accordingly, the same common voltage (Vcom) is supplied to the first to third common voltage lines 170a to 170c.

In FIG. 14, the common voltage lines 170 and the vertical gate line 150 and data line 160 are disposed on different layers with the insulating layer 145 therebetween. Although the lines are disposed on different layers, since the third common voltage line 170c is disposed between the vertical gate line 150 and the data line 160, a common voltage (Vcom) of −2 V to +3 V, for example, can prevent the coupling of electric fields from occurring in the long-axis direction of each pixel due to a high-voltage scan signal.

That is, an electric field caused by the high-voltage scan signal applied to the plurality of vertical gate lines VGL can be counteracted using the third common voltage line 170c disposed between the plurality of vertical gate lines VGL and the plurality of data lines DL.

Here, an active pattern remains in a process that forms a TFT under the vertical gate line 150 and data line 160. This is because a source electrode and drain electrode of the TFT, the vertical gate line 150, and the data line 160 are formed in a single process. Even in the following embodiment, the active pattern of the TFT can remain under a specific line.

In the above-described pixel structures of FIGS. 6, 13 and 14, an aperture ratio of each pixel can decrease by a certain degree due to the plurality of vertical gate lines VGL. To solve such a problem, as illustrated in FIG. 16, another pixel structure is presented.

Figure 16:
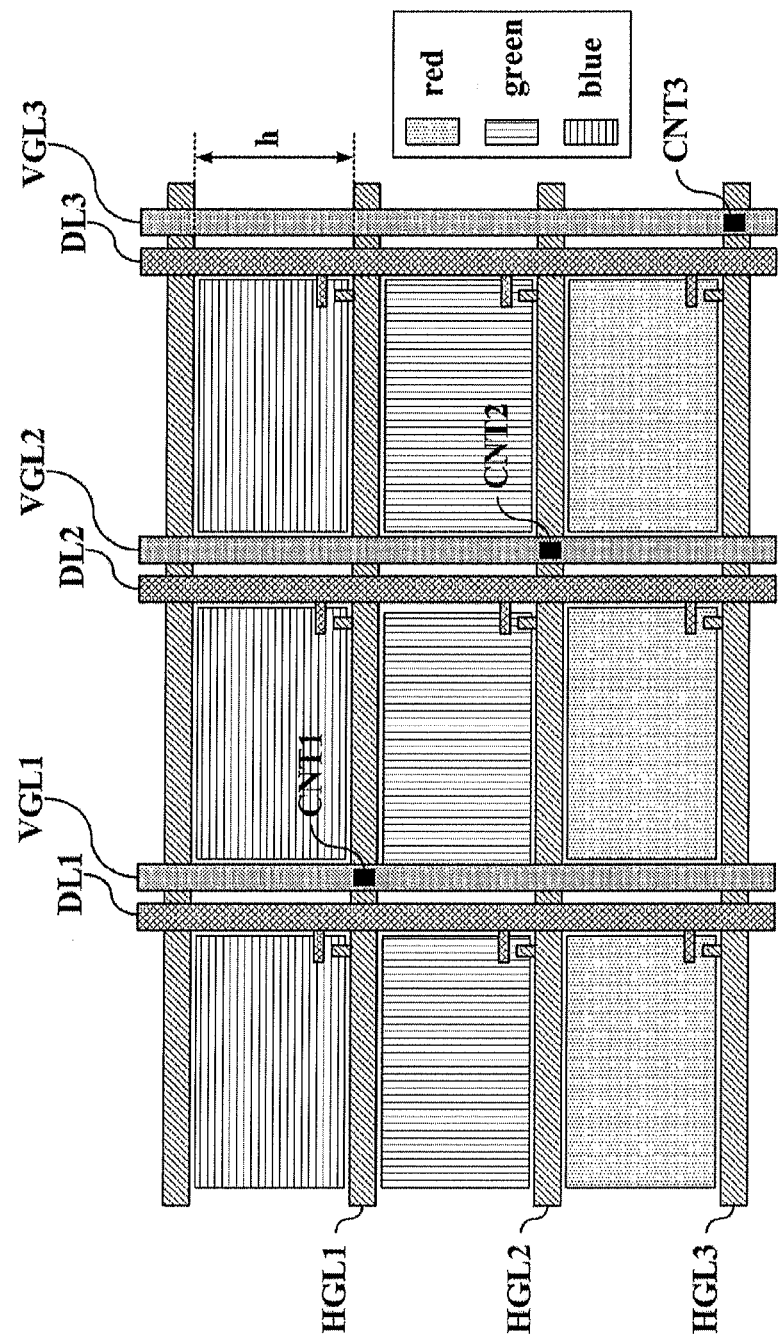
FIG. 16 illustrates a pixel structure of an LCD device according to a fifth embodiment of the present invention.

FIG. 16 illustrates a pixel structure of an LCD device according to a fifth embodiment of the present invention. Referring to FIG. 16, the proportion of space occupied by the vertical gate line VGL in an area of a pixel is reduced by rotating the pixel structures of FIGS. 6, 13 and 14 by 90 degrees, thus improving an aperture ratio.

The plurality of vertical gate lines VGL and the plurality of data lines DL are vertically formed from the upper side to the lower side. The plurality of horizontal gate lines HGL are horizontally formed from the left side to the right side (or from the right side to the left side). Contacts between the plurality of vertical gate lines VGL and the plurality of horizontal gate lines HGL may be made as described above with respect to FIG. 6.

In the above-described pixel structures of the first to fourth embodiments, the height (Y-axis) of the pixel may be greater than the width (X-axis) of the pixel. However, in the fifth embodiment of FIG. 16, a pixel structure is formed in which the height of the pixel (Y-axis) is shorter than the width (X-axis) of the pixel. That is, a length of each pixel is formed as a short axis, and a width of each pixel is formed as a long axis, thus decreasing an area occupied by the vertical gate line VGL in each pixel.

Even in the LCD device according to the fifth embodiment of the present invention illustrated in FIG. 16, identically to the above-described embodiment, the link line and the GIP logic can be removed from the left and right non-display areas of the related art liquid crystal panel.

Accordingly, the left non-display area of the liquid crystal panel 100 is formed with the common voltage link area 122 and the ground link area 124, but without link lines, GIP logic, and/or other gate driving logic. The right non-display area of the liquid crystal panel 100 may be similarly formed. As such, this implementation may reduce the bezel width and/or non-display area width to 1.0 mm to 1.6 mm, for example.

In the first to fourth embodiments of the present invention, a narrow bezel is realized by decreasing the bezel widths of the left and right non-display areas of the liquid crystal panel 100, as narrow as 1.0 mm to 1.6 mm in some implementations.

In the LCD device according to the fifth embodiment of the present invention illustrated in FIG. 15, each pixel is rotated by 90 degrees, and the common voltage link area 122 and the ground link area 124 are formed in the top and bottom non-display areas of the liquid crystal panel 100, e.g., instead of forming the common voltage link area 122 and the ground link area 124 in the left and right side of the liquid crystal panel 100.

Accordingly, by positioning the common voltage link area 122 and ground link area 124 at the top and bottom of the liquid crystal panel 100, the left and right non-display areas may be further reduced in width, e.g., through the left bezel width and right bezel width respectively occupied by the common voltage link area 122 and ground link area 124. Thus, the left and right non-display areas may be further reduced to 0.8 mm to 1.0 mm (or less) in some implementations, and a reduced bezel width for coupling of the upper substrate 110 and the lower substrate 120 is formed, thereby realizing a narrow bezel.

Here, the left bezel width and right bezel width of the liquid crystal panel 100 are determined, at least in part, by the line width of the sealant used to couple the upper and lower substrates, and thus, since the line width of the sealant can be realized to less than 1 mm at the present technical level, the left bezel width and right bezel width of the LCD device according to the embodiments of the present invention can be sufficiently reduced to 1 mm or less.

When technology of controlling the line width of the sealant is more advanced in the future, the left bezel width and right bezel width of the LCD device according to the embodiments of the present invention can decrease.

As described above, in the LCD device according to the embodiments of the present invention, the left and right sizes of the bezel formed to surround the non-display area of the liquid crystal panel can be reduced. According to the present invention, by decreasing the bezel size to about 1 mm, a relatively broader display screen can be provided to users, and the aesthetic design appearance of the LCD device can be enhanced.

In the LCD device according to the embodiments of the present invention, the size of the bezel formed at the outer portion of the liquid crystal panel can be reduced.

In the LCD device according to the embodiments of the present invention, an aesthetic design appearance can be enhanced.

In the LCD device according to the embodiments of the present invention, a narrow bezel and a borderless panel can be implemented such that the lower instrument, left instrument, and right instrument of the liquid crystal panel are not exposed to the front.

In the LCD device according to the embodiments of the present invention, an aperture ratio of each pixel increases, and a charging time of signals supplied to each pixel is sufficiently secured, thus securing a driving stability.

In the LCD device according to the embodiments of the present invention, the size of the pad area can be reduced.

In the LCD device according to the embodiments of the present invention, the manufacturing cost can be saved.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
a plurality of first gate lines and a plurality of data lines disposed in a first direction in a liquid crystal panel;
a plurality of second gate lines disposed in a second direction vertical to the first direction in the liquid crystal panel, the plurality of first gate lines and the plurality of second gate lines being disposed on different layers; and
a driving integrated circuit (IC) disposed in an upper or lower non-display area of the liquid crystal panel, the driving IC connected to the plurality of first gate lines to supply a scan signal, and connected to the plurality of data lines to supply data voltages,
wherein the plurality of first gate lines and the plurality of second gate lines extend through a display area in which a plurality of pixels are defined, and are electrically connected to each other in pairs, and
wherein each of the first gate lines is spaced apart from a corresponding data line in the second direction with a common voltage line disposed therebetween.

2. The LCD device of claim 1, further comprising:
a common voltage link area for supplying a common voltage to the plurality of pixels disposed in a left non-display area and a right non-display area of the liquid crystal panel.

3. The LCD device of claim 1, further comprising:
a ground link area disposed in a left non-display area and a right non-display area of the liquid crystal panel.

4. The LCD device of claim 1, wherein the plurality of first gate lines and the plurality of second gate lines are provided of the same number in one-to-one correspondence relationship.

5. The LCD device of claim 1, wherein the plurality of first gate lines and the plurality of data lines are provided of the same number in a one-to-one correspondence relationship.

6. The LCD device of claim 1, wherein number of the plurality of first gate lines is half of number of the plurality of data lines.

7. The LCD device of claim 1, wherein,
the plurality of second gate lines and the plurality of data lines are provided in a double reduced data (DRD) structure, and
the plurality of first gate lines are disposed in respective spaces between a plurality of pixels in which one of the plurality of data lines is not provided.

8. The LCD device of claim 1, wherein two data lines of the plurality of data lines are disposed in correspondence with one of the plurality of first gate lines.

9. The LCD device of claim 1, further comprising first and second common voltage lines corresponding to a first gate line of the plurality of first gate lines and a first data line of the plurality of data lines, where the first gate line and the first data line are positioned between the first and second common voltage lines.

10. The LCD device of claim 9, further comprising a third common voltage line disposed between the corresponding first gate line and the corresponding first data line.

11. The LCD device of claim 10, wherein the third common voltage line, disposed between the corresponding first gate line and the corresponding first data line, counteracts an electric field caused by the scan signal applied to the plurality of first gate lines.

12. The LCD device of claim 1, wherein:
a plurality of pixels formed in the liquid crystal panel are formed such that a pixel width of each of the plurality of pixels is greater than the pixel height.

13. The LCD device of claim 12, wherein:
a common voltage link area for supplying a common voltage to a plurality of pixels in the liquid crystal panel and a ground link area are disposed in an upper or lower non-display area of the liquid crystal panel and not in the right or lower non-display area of the liquid crystal panel.

14. The LCD device of claim 1, wherein:
gate driving logic generating the scan signal and data driving logic generating the data voltages are merged into the driving IC; or
a data driving IC and a gate driving IC are merged into the driving IC.

15. The LCD device of claim 14, where the driving IC further comprises a plurality of gate link lines and a plurality of data link lines.

16. The LCD device of claim 1, wherein the plurality of first gate lines and the plurality of data lines are disposed on the same layer.

17. The LCD device of claim 1, wherein one of the plurality of first gate lines and one of the plurality of second gate lines are electrically connected to each other through a contact in an overlapping area therebetween.

18. A liquid crystal display (LCD) device comprising:
a plurality of first gate lines and a plurality of data lines disposed in a first direction and parallel to each other in a display area in which a plurality of pixels are defined and disposed in a liquid crystal panel;
a plurality of second gate lines intersecting with the plurality of first gate lines in the display area and disposed in a second direction vertical to the first direction in the liquid crystal panel, the plurality of first gate lines and the plurality of second gate lines being disposed on different layers; and
a driving integrated circuit (IC) disposed in an upper or lower non-display area of the liquid crystal panel, the driving IC connected to the plurality of first gate lines to supply a scan signal, and connected to the plurality of data lines to supply data voltages,
wherein the plurality of first gate lines and the plurality of second gate lines are electrically connected to each other in pairs, and
wherein each of the first gate lines is spaced apart from a corresponding data line along the second direction with a common voltage line disposed therebetween.

19. The LCD device of claim 18, wherein one of the plurality of first gate lines and one of the plurality of second gate lines are electrically connected to each other through a contact in an overlapping area therebetween.

20. The LCD device of claim 1, further comprising a plurality sets of common voltage lines parallel to the plurality of first gate lines and the plurality of data lines, wherein each set of the common voltage lines includes a first common voltage line, a second common voltage line, and a third common voltage line.

21. The LCD device of claim 20, wherein the third common voltage line is disposed between a corresponding first gate line and a corresponding data line, the corresponding first gate line is disposed between the corresponding first and third common voltage lines, and the corresponding data line is disposed between the corresponding second and third common voltage lines.

* * * * *